Figure 1:
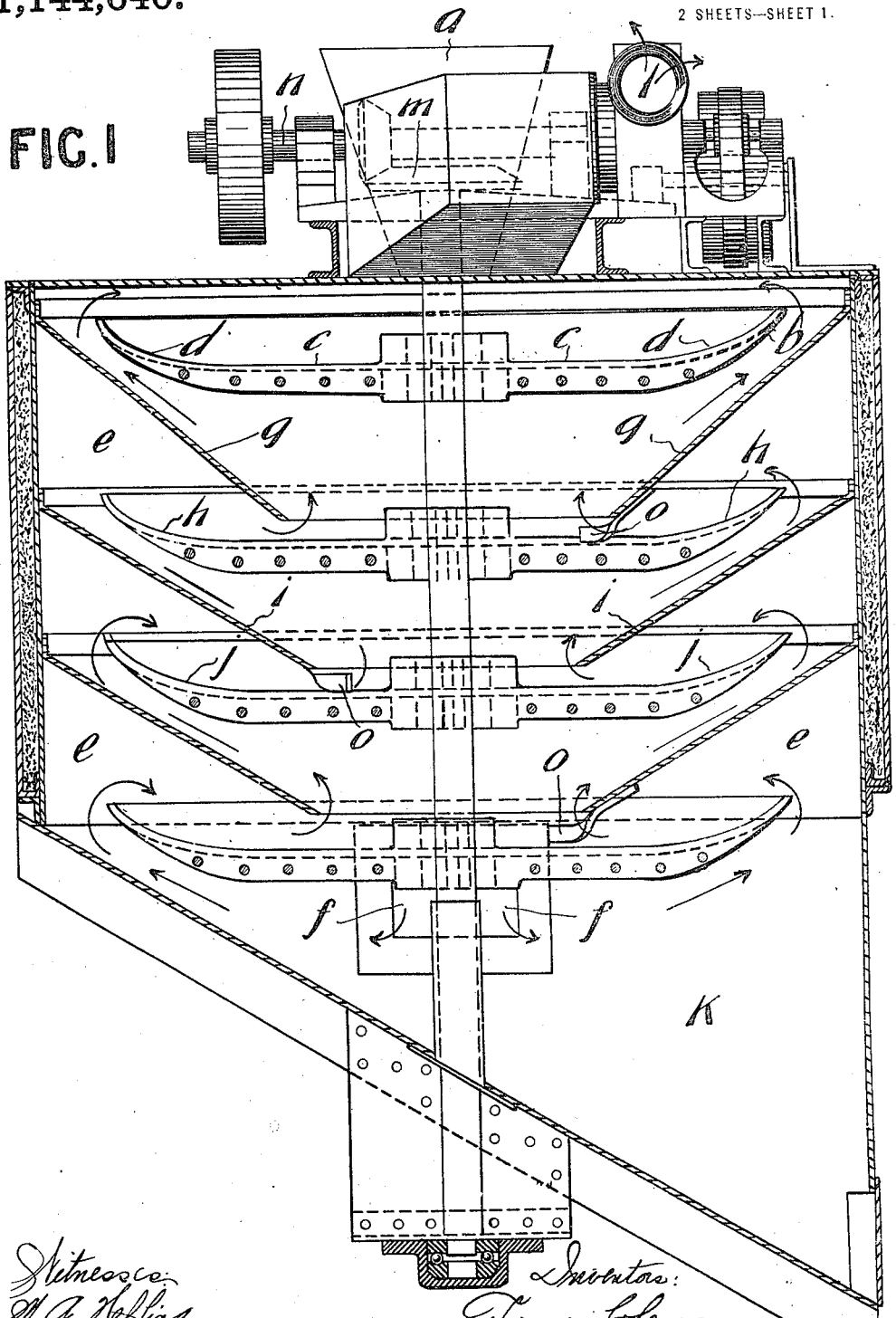

T. COLEMAN, A. COLEMAN, T. COLEMAN, Jr. & F. COLEMAN.
DRYING AND HEATING APPARATUS.
APPLICATION FILED JUNE 11, 1914.

1,144,640.

Patented June 29, 1915.
2 SHEETS—SHEET 1.

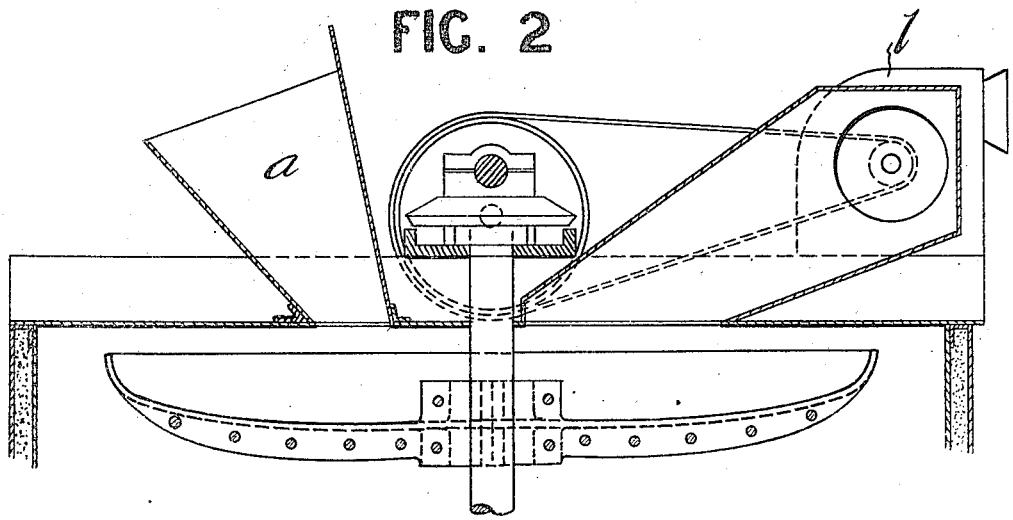

UNITED STATES PATENT OFFICE.

THOMAS COLEMAN, ALFRED COLEMAN, THOMAS COLEMAN, JR., AND FRANK COLEMAN, OF DERBY, ENGLAND.

DRYING AND HEATING APPARATUS.

1,144,640.  Specification of Letters Patent.  Patented June 29, 1915.

Application filed June 11, 1914. Serial No. 844,596.

*To all whom it may concern:*

Be it known that we, THOMAS COLEMAN, ALFRED COLEMAN, THOMAS COLEMAN, Jr., and FRANK COLEMAN, citizens of Great Britain, all residing at Alfreton Road, Derby, county of Derby, England, manufacturers, have invented new and useful Improvements in Drying and Heating Apparatus; and we do hereby declare the following to be a full, clear, and exact description of the same.

This invention comprises improvements in or relating to apparatus for treating stone, grit, sand, and other similar materials, for preparing them for use in forming or repairing roads and the like. In the treatment of such materials for this purpose we dry and heat the materials in an apparatus which is the subject of the present improvement to remove any moisture and impart the requisite degree of heat to enable the material to be mixed with a binding-material such as bitumen, asphalt, tar or the like. The resulting material is adapted for forming a durable and dustless road and the apparatus for its treatment should preferably be portable to enable the treatment to be carried on at the site where the road construction or repair is to be carried out.

The features of novelty will be pointed out in the appended claims and the construction and operation of a convenient embodiment of the improvement will be understood from the drawings and following description.

Figure 1 is a general sectional view of the apparatus. Fig. 2 is a sectional view of the upper part of same at right angles to Fig. 1.

In this embodiment the material to be treated is charged from a hopper *a* or in any convenient manner onto a plate *b* or disk member which is arranged for rotation. The disk or plate member is curved upwardly toward its perimeter. It is preferred to employ a flat center part *c* for the disk with the part toward the edge or rim of the disk curved upwardly as at *d*.

The member disk *b* is mounted within a suitable casing *e* to which hot gases from a furnace or heated air is led in any suitable manner, such as through the opening *f*. The disk is rotated and the material is fed onto it and progresses toward the perimeter which, owing to its curved up formation, retains the material on the disk under the influence of heat for a longer period than would be the case with a plain disk.

It is preferred particularly when treating stone or materials in which the component pieces are relatively large to surround the disk with an inverted cone *g*, which receives material falling from or thrown off the disk, which we prefer shall lead to a second disk *h* on the same driving spindle and this may be similarly equipped with a cone *i* or other receiving surface leading if desired to a further disk *j*. Any convenient number of the rotating disks may be thus employed; four are shown on the drawing and in the preferred construction the receiving surface from the final disk is an inclined or conical bin or hopper *k* formed by the bottom of the casing itself.

The hot gases or heated air may be led in near the lower part of the casing at *f*, and the steam and moisture driven off the material may be carried away by an exhaust fan *l* arranged on the top plate of the casing. Any suitable driving arrangements may be made for instance the upper end of the driving spindle may be carried through the top plate and be driven by bevel gearing *m* from a horizontal shaft *n* for which suitable bearings will be provided and this shaft may be driven by chain or other means from an internal combustion engine carried on a suitable part of the frame or from an electric motor or other means.

To prevent the material lying on the disk members near the center where centrifugal effort is less, we may arrange a finger *o* placed in oblique position; this also serves the purpose of keeping the opening at the bottom of the cones clear for the upward passage of the gases. The path of the gases is indicated by arrows.

The curve of the plates or disk member is so arranged that as it approaches the perimeter of the disk where the centrifugal effort will be much greater, the resistance increases so as to retain the material from being thrown straightway from the disk. As more material is fed onto the member however and travels rapidly over the flat part of the disk it thrusts upon the material retained by the curve and the latter is thrown off and impinges against the fixed cones *g* falling down the hot surface of same in a separated condition, the action is repeated on the next disk and an effective and rapid drying and heating of the material is obtained.

The speed of the rotary members will naturally be suited to the materials to be treated; we find with an apparatus employing disks five feet in diameter that 40 revolutions per minute is a satisfactory speed for broken stone increasing to 60 or 70 for sand.

What we claim then is:

1. In an apparatus for drying and heating road making materials, such as stone and sand, a casing including at the top means for introducing the material to be heated and means for admitting heated gases at the bottom, said casing being provided with a series of superposed inverted conical walls forming communicating receiving chambers, a rotatable disk member in each chamber for receiving successively the material from said walls, each disk having a flat central portion and an upturned peripheral discharge edge to retard the passage of the material over the edge during the rotation thereof, the conical wall subjacent the initial intake disk and delivering to the next lower disk having an inclination greater than the conical walls subjacent thereto for insuring an initial downward movement of the material having the greatest moisture.

2. In a drying and heating apparatus, a casing including means for feeding the material to be treated into the top and means for admitting heated gases at the bottom thereof, superposed rotatable receiving disks in said casing having upturned peripheral discharge edges, conical walls in said casing between said disks and having discharge ends projecting below the upturned edges of said disks and discharging inwardly of the periphery thereof, whereby the heated gases are caused to successively pass over the under surface of each disk to heat the lower strata of material therein, and are deflected by the said conical walls onto the material carried by said disks, thereby heating the upper strata of material and passing through the latter and upwardly through said discharge ends.

3. In a drying and heating apparatus, a casing including means for feeding the material to be heated into the top and means for admitting heated gases at the bottom, superposed rotatable receiving disks in said casing having upturned peripheral discharging edges, conical receiving walls in said casing between said disks having discharge ends projecting below the upturned discharge edges of said disks and inwardly of the periphery thereof, the discharge end of each wall being raised above its respective disk a successively increasing distance inversely to the direction of flow of the heated gases whereby the material in the lower disk is subjected to a greater amount of heat than the material in the next preceding disk.

4. In a drying and heating apparatus, a casing including means for feeding the material to be heated into the top, and means for admitting heated gases at the bottom thereof, a rotatable material receiving disk in said casing having an upturned peripheral discharge edge, and a delivery wall having its discharge end projecting inwardly from the periphery of the disk and below the peripheral discharge edge thereof, substantially as described.

In testimony whereof, we have signed our names to this specification in the presence of two subscribing witnesses.

THOMAS COLEMAN
ALFRED COLEMAN.
THOMAS COLEMAN, JUNR.
FRANK COLEMAN.

Witnesses:
L. DAWSON HARDCASTLE,
S. WHEEN.